United States Patent [19]

Starrett

[11] 3,750,902

[45] Aug. 7, 1973

[54] ROTARY VALVE IMPROVEMENTS
[75] Inventor: James R. Starrett, Springfield, Ohio
[73] Assignee: The Bauer Brothers Company, Springfield, Ohio
[22] Filed: Mar. 1, 1971
[21] Appl. No.: 119,682

[52] U.S. Cl. ............ 214/17 CC, 222/194, 222/368
[51] Int. Cl. ........................................... B66c 17/04
[58] Field of Search ................... 251/161, 162, 163; 222/194, 368; 415/122, 182; 214/17 CC, 17 A

[56] References Cited
UNITED STATES PATENTS

| | | | |
|---|---|---|---|
| 1,976,052 | 10/1934 | Whittle | 251/161 |
| 3,272,223 | 9/1966 | Sass | 251/161 X |
| 3,273,758 | 9/1966 | Starrett | 222/194 |
| 1,442,452 | 1/1923 | Taylor | 251/161 |
| 2,820,605 | 1/1958 | Dougherty | 251/163 |

*Primary Examiner*—Harold W. Weakley
*Attorney*—Jerome P. Bloom

[57] ABSTRACT

This disclosure is directed to material handling valves of a rotary type featuring unique bearing support structure for its rotor shaft. Such support structure is distinguished by eccentric inserts which are simply adaptable to readily preset the valve rotor and condition the valve housing to accommodate various conditions of differential pressure to which the rotor may be exposed. The structure enables that on operation of a valve under conditions where different portions of its rotor are exposed to different temperatures and pressures the rotor will inherently center in its housing.

8 Claims, 6 Drawing Figures

INVENTOR
JAMES R. STARRETT
BY Jerome P. Bloom
ATTORNEY

INVENTOR
JAMES R. STARRETT

BY Jerome P. Bloom

ATTORNEY

ROTARY VALVE IMPROVEMENTS

BACKGROUND OF THE INVENTION

This invention relates to improvements in rotary valves and, more particularly, to means for more readily establishing a powered valve rotor in centered relation to its housing. It has special advantage for use in valves employed to transfer materials from one type of an environment to another. By way of example, but not by way of limitation, the invention will be so described in application to a rotary valve unit of the type illustrated in the U. S. Pat. No. 3,273,758 issued to J. R. Starrett on Sept. 20, 1966.

Material handling valves used for transferring material to and from a pressurized environment face unique operating conditions and demands. On one side they are normally subject to atmospheric conditions and on the opposite side to elevated temperature and pressure. In respect to rotary valves, in particular, the differential pressure to which the valve rotor is exposed under such conditions can many times produce unpredictable stress and strain on various elements of the valve structure. The basic problem which presents itself is the possibility of distortion of the supporting structure for the valve rotor and/or the rotor housing. This throws the rotor out of position and produces severe damage and valve malfunction. To alleviate this problem the solution heretofore has been to pre-stress various segments of the valve housing and rotor shaft bearing support structure through the medium of jacks and screw means. The desired result is to establish the rotor in a properly centered position in the valve housing in use. As long as the inherent differentially applied stresses and strains do not exceed a certain level, the prior practice for achieving an operating balance for a valve rotor exposed to differential pressure has been reasonably satisfactory. However, there have been many instances where the prior art solution has proven inadequate to meet the size and level of the pressure differential existing on the rotor. The results of this has been an imbalance and offset of the rotor in respect to its housing, with consequent chewing up of the rotor bearing surface. With such undesirable conditions there is always the danger of damage to other parts of the valve including the rotor shaft and its bearing housing support structure.

It is noted that the above mentioned-problem has become increasingly evident as the pulp and paper industry, for example in its refining procedures, is demanding material handling valves of increasingly larger capacity and proposing to submit the same simultaneously to different environments producing thereon a wide range of differential pressure.

SUMMARY OF THE INVENTION

The present invention is a definite and simple solution to the above problem. It provides means whereby a rotary material transfer valve may be simply modified to appropriately position the valve rotor and condition related support and housing structure so that in operation of the valve the rotor will inherently center and operate in balance with the system to which it is applied. The nature of the improvement is such that, if the system conditions change, there can be an easy adjustment of the valve to meet the change in stress and strain to which its rotor will be subjected in the course of its operation.

The invention is simple and in a preferred application has been embodied by modification of the structure providing the bearing support for the shaft of the valve rotor. It has been found that the solution to the basic problem is a unique employment of devices including eccentrics which pere-set critically influenced valve structure to anticipate and adapt to the operating conditions to which the valve rotor will be subjected.

It is therefore a primary object of the invention to provide improvements in rotary material handling and transfer valves which are simple to apply and which render such valves more efficient and satisfactory in use in a greater variety of applications and unlikely to malfunction.

A further object of the invention is to modify material handling valves of the rotary type so they can more readily accommodate and adapt in use to the stress and strain of opposed sides of the valve rotor being simultaneously exposed to extremes in pressures and temperatures.

Another object of the invention is to provide simple but improved means to pre-set a rotor unit and precondition the bearing support therefor so that in use the rotor will center in its housing and operate relatively free of friction and imbalance.

An additional object of the invention is to simply utilize eccentric means to condition a rotor of a material handling valve to operate in balanced condition on simultaneous exposure thereof to different levels of pressure.

A further object of the invention is to provide a rotary valve with improvements possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is found one but not necessarily the only form of embodiment of the invention, FIG. 1 is a longitudinal sectional view of a rotary valve improved in accordance with the present invention;

Like parts are indicated by similar characters of reference throughout the several views.

Figure 1:
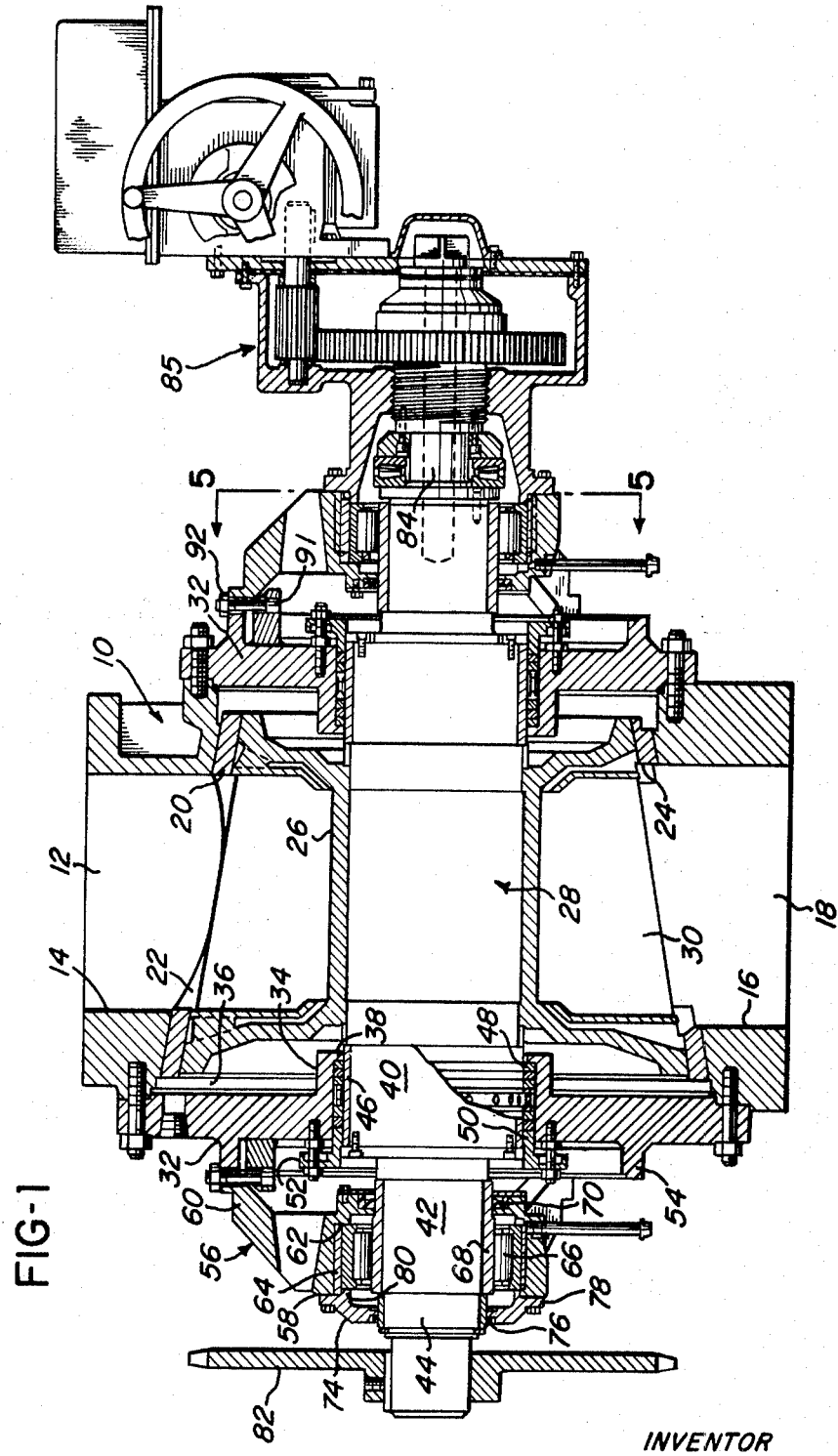

Referring to the drawings, in the embodiment of the invention illustrated, the rotary material handling valve shown includes a basic tubular shell 10 open to either end and defining at its interior a through passage of generally conical convergent form. The shell 10 forms a portion of a valve housing having at the top thereof an inlet opening 12 defined by a tubular projection 14. At the bottom of the shell 10, in alignment with the projection 14, is a second tubular projection 16 defining a discharge opening 18. Fixed in the shell 10, the length of its through passage, is a conically convergent sleeve the wall of which has a uniform thickness. This sleeve defines a liner 20 having an opening 22 in alignment with the inlet opening 12 and a further opening 24 in alignment with the discharge opening 18.

Contained by the liner 20, in close fit relation to its inner surface, from end to end thereof, is a rotor 26 which is also of conically convergent configuration at its outer periphery. The rotor 26 incorporates a shaft means 28 in the line of its central longitudinal axis. The shaft means 28 extends axially from either end of the rotor 26 and projects outwardly of either end of the shell 10. The outer periphery of the rotor has formed therein a series of circumferentially spaced pockets 30 which on drive of the rotor will follow a circular path, in the course of which the rotor pockets will successively align with the inlet and outlet openings formed in the shell 10 and its liner 20.

Bridging each end of the shell 10 and suitably fixed in respect thereto, to form a seal, is a closure plate 32. Since the closure plates 32 differ only in dimension, only one will be particularly described. Accordingly, looking to the closure plate 32 bridging the through passage in the shell 10 to its largest end, such plate has a generally annular configuration. Its inner periphery is defined by a cylindrical hublike portion 34 which is projected inwardly of the shell 10 to dispose in a chamber 36 defined between the inner surface of the closure plate and the adjacent dished end face of the rotor 26. Formed integral with the inner projected extremity of the hub 34 is an internal flange 38. The cylindrical hub portion 34 accommodates the projection therethrough of one end of the shaft means 28. That portion of the shaft means which projects through the closure plate 32 includes successively reduced sections 40, 42 and 44. The section 40 projects through and to either end thereof extends slightly beyond the longitudinal extent of the hub 34. Mounting about and coextensive with the section 40 is a packing sleeve 46. Within the hub 34 the sleeve 46 mounts a series of circular glands intermediately of which is positioned a lantern ring, the whole being defined by the numberal 48. The glands are confined by a tubular packing follower 50. The follower 50 includes an external flange portion 52 which positions outwardly and in spaced relation to the outer face of the plate 32. Fixed to the plate 32 are studs which project through apertures in the flange 52 to mount threadedly engaged nuts. The latter may be adjusted in an obvious manner to clamp the follower 50 in place. There is thus provided a bearing seal between the inner periphery of each closure plate 32 and the portion of the shaft means which projects therethrough.

On the outermost face of each plate 32, formed integral therewith, is a tubular or ring-like projection 54 the surface of the projected extremity of which is stepped at its inner periphery. The projection 54 is bridged by a spider-like structure 56 the body of which is defined by a generally tubular element 58. The element 58 is displaced outwardly from the related closure plate 32 and the projection 54 by three equidistantly spaced, relatively divergent, leg portions 60 formed integral therewith. The projected feet of the leg portions 60 are stepped to be complementary to and to seat to the projected extremity of the related ring 54. So seated the feet are welded in place.

The tubular element 58 has its inner wall stepped at its end most adjacent the related closure plate 32, which end nests inwardly of and within the confines of the divergent spider legs. This provides therein a reduction in cross section of its interior forming a shoulder 62 facing in a sense outwardly of the plate 32. An eccentric sleeve 64 is inserted in the relatively expanded end of the tubular element 58 remote from the related closure plate 32 to have its inner end seat to the shoulder 62 and its outer surface in abutment with the inner surface of the tubular element. Inserted in and nesting immediately within the sleeve 64 is a bearing unit 66 for the portion 42 of shaft means 28. The outer race of this bearing unit has one face also in abutment with the shoulder 62 while its inner race includes at its inner periphery means defining a tubular sleeve 68. The sleeve 68 is not only coextensive in length with the outer bearing race but projects therebeyond to either end. One end of the sleeve 68 extends beyond the innermost end of the tubular element 58 to seat in abutting relation to a shoulder provided on shaft means 28 between the shaft sections 40 and 42. It is noted that suitable seal means 70 are fixed in the innermost end of tubular element 58, in abutment with an internal flange formed therein and immediately about the inner projected extremity of the tubular sleeve 68. The details of the seal 70 and the mounting thereof are not per se essential to an understanding of the invention and well within the skill of a mechanic versed in the art. Therefore they are not further described.

In the case of each tubular element 58 the outer end thereof is capped by an annular element 74. This element 74 has the body thereof slip fit about a packing sleeve 76 immediately surrounding the portion 44 of the shaft means which immediately follows the shaft portion 42. Suitable bearing seal means are conventionally provided between the inner periphery of the cap 74 and the packing sleeve 76. The outer peripheral portion of the cap 74 includes a flange 78 which seats on and is bolted to the outer projected extremity of the tubular element 58. Integral with the flange 78, at its inner periphery, is a tubular projection 80 which nests within and peripherally bears on the inner surface of the sleeve 64 and has its projected extremity in abutment with the outer face of the outer race of bearing 66. This contains the bearing to the shoulder 62. In this manner bearing housings are provided for the rotor shaft means the significant element of which, in accordance with the present invention, is the eccentiric sleeve 64 which will be further described.

Fixed in driving relation to the rotor shaft means at the end thereof spaced outwardly of the largest enclosure plate 32 is a drive sprocket 82 through the medium of which the rotor 26 may be appropriately driven. The remote end of the shaft means 28 has in connection therewith a spindle 84 bolted to form an axial extension thereof. Mounting in operative association with the spindle 84 are suitably supported adjusting means 85 through the medium of which the spindle and correspondingly the rotor shaft means may be axially adjusted to move the rotor 26 to and from a nested position within the liner 20. The range of adjustment in the assembly of the valve unit is defined by the spacing between the larger enclosure plate 32 and the adjacent relatively larger end of the rotor 26 providing the chamber 36 when the rotor is in position. The details of the rotor adjusting means may be identical with those shown in the U.S. Pat. No. 3,273,758. Since such details are not in and of themselves necessary to an understanding of the invention, they are not incorporated herein.

It is common practice where a valve such as shown in the drawings is to be used to pass materials from one environment to another, such as from an atmospheric environment to a highly pressurized and elevated temperature environment, to provide means for introducing steam to pressure materials in the rotor pockets 30 in the course of moving from the valve inlet to the valve outlet to condition the materials to discharge to the pressurized environment when the rotor pockets align with the valve outlet. Means are also normally provided in such instances to vent the pockets prior to reaching the valve inlet. Details of this nature which are indicated to some extent in the drawings are not here described since they are not pertinent to the invention. However, it must be noted and understood that in this case as in any case where there is movement of material from an atmospheric to a pressurized environment and steam is conventionally applied in the rotor pockets that there will be a leakage past the ends of the valve rotor during the operation thereof. As a result, the chambers or valve end bells 36 defined in the spacing of the respective end closure plates and the adjacent ends of the rotor with the rotor in operating position will be continually filled with highly pressurized steam at a high temperature. Accordingly the temperature and pressure of the steam is reflected on the end closure plates 32.

Figure 2:
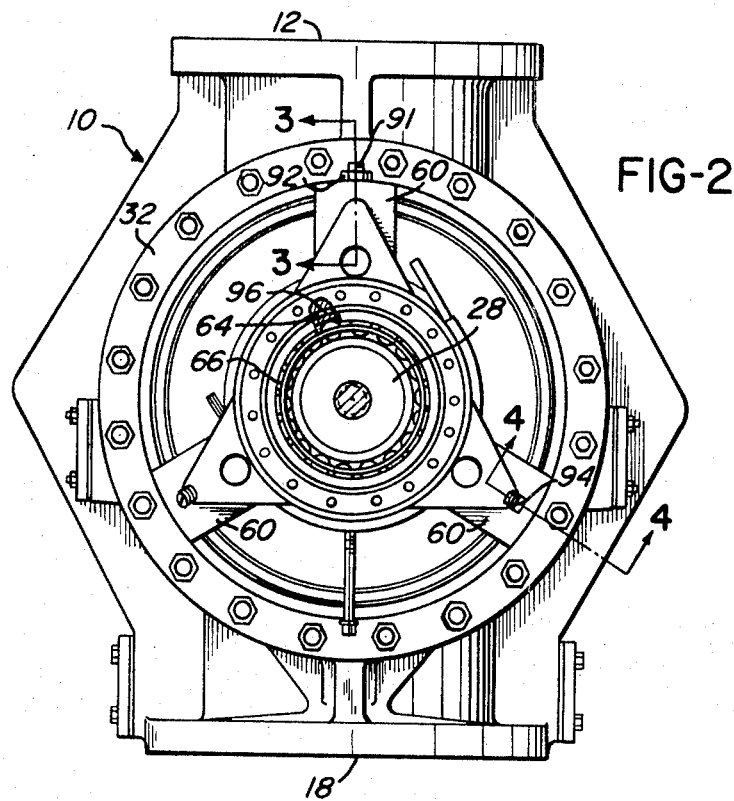
FIG. 2 is an end view of the valve of FIG. 1 with parts in section.
Figure 3:
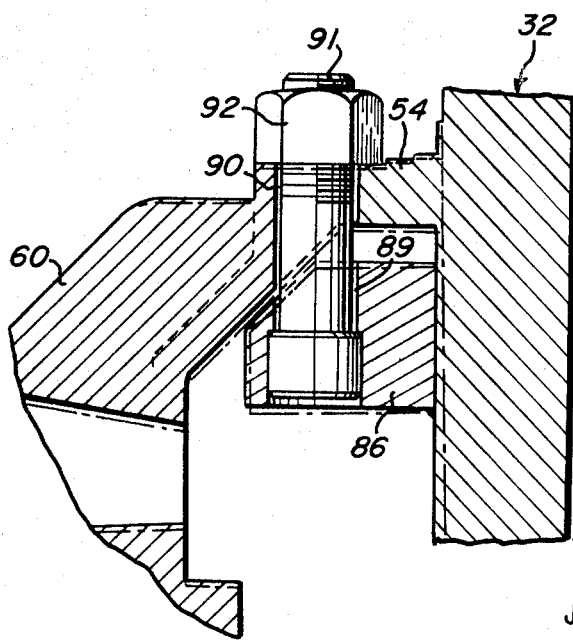
FIG. 3 is a view taken on line 3—3 of FIG. 2.
Figure 4:
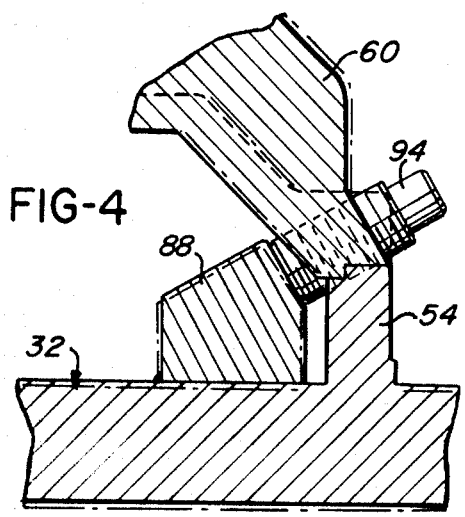
FIG. 4 is a view taken on line 4—4 of FIG. 2.
Figure 5:
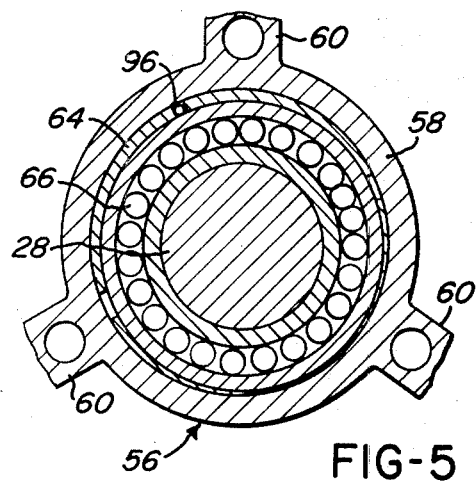
FIG. 5 is a sectional view of the rotor bearing support structure in accordance with the invention taken on line 5—5 of FIG. 1.
Figure 6:
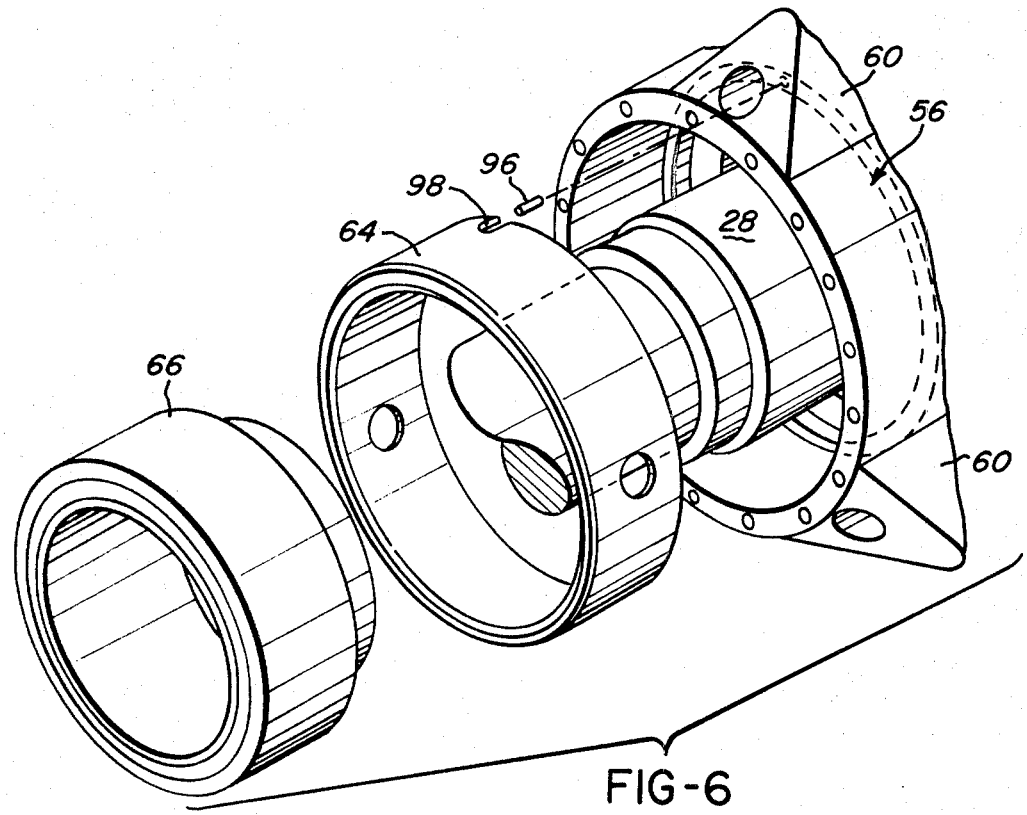
FIG. 6 is an exploded view of the rotor bearing support structure.

Looking now more particularly to FIGS. 2, 3 and 4 of the drawings, three equidistantly spaced lugs, 86, 87 and 88, are welded integral with each closure plate 32, on its outer surface and concentric with its center and the ring 54, one disposing spaced immediately inward of the foot of each spider leg 60. As seen in FIG. 2 of the drawings, in the example where the valve serves as an inlet to a pressurized environment, as the plate units 32 are applied, the spider legs 60, which are triangularly disposed, are so arranged to provide that one is uppermost and projects vertically while the other two are spaced approximately 120° from the first and in reference to each other. Thus, there is one lug 86 at the top of the end plate to each end of the valve in a common central vertical plane extending from end to end of the valve. Moreover, the other lugs 87 and 88 toward the bottom of the end plates are symmetrically disposed to either side of this plane. The upper lug 86 has a radially oriented through aperture 89 in alignment with a corresponding aperture 90 in the adjacent spider leg 60. The aperture 89 in the lug 86 has a counterbore expanding the same at its innermost face to provide that on application of a bolt 91 to project through the apertures 89 and 90 the expanded head of the bolt will seat to the shoulder formed by this counterbore. The projected extremity of the bolt 91 extends outwardly of the leg 60 where it is threadedly engaged by a nut 92. By suitable adjustment of the nut 92 certain stresses may be applied to the leg 60, the lug 86 and related portions of the connected closure plate 32 and thereby portions of the valve housing and tubular bearing housing 58.

Referring to FIG. 4 of the drawings, angularly directed and threadedly engaged inwardly of and through each of the lowermost legs 60 is a jack screw 94. The innermost end of each screw 94 seats on a surface portion of the adjacent lug 87 or 88 which is angled complementarily to dispose at right angles to the screw. As may be readily seen, in this instance also certain stresses may be placed on the lugs 87 and 88 and the related closure plates 32 constituting a portion of the valve housing.

In use of the invention structure, as has been noted, in the first instance each closure plate unit 32, including the flexible ring 54 on which is supported the spider 56, and tubular member 58, is fabricated to be an integral structure. Then, prior to application to the shell 10, the jack bolt 91 and jack screws 94 are adjusted to pre-stress the closure plate and the spider legs 60 to produce a force influence on tubular member 58 directed in a line which if projected would extend between the lower laterally divergent spider legs. Simultaneously, the inner peiphery of the closure plate is also pre-stressed to resist the plate deformation in use. It must be recognized that periphery the case illustrated where the chambers 36 are filled with high temperature steam the effect thereof will be to impose on the inner periphery of the closure plate 32 which it contacts a stress the resultant component of which will act in a sense inwardly of chamber 36.

In the manner described, the spider legs 60 and the tubular member 58 are rigidified and conditioned so that on bolting the end closure plates 32 to shell 10, they will resist deformation under the influence of a thrust resulting from an unbalanced pressure on the valve rotor, the resultant force of which pressure is in a line directed from the side of the valve most adjacent the legs 60 which symmetrically diverge from the vertically oriented leg 60.

Consider now the use of the illustrated valve to receive material under atmospheric temperature and pressure conditions through its inlet to deliver the same to a high temperature pressurized environment by way of its outlet. In the practice of the invention, in the inoperative condition of the valve, its rotor 26, in the first instance, will be backed out of the shell 10 and liner 20 by energizing the adjusting means 84, 85 in connection with its shaft means 28. The displacement is limited by the depth of the end bell chamber 36 adjacent its largest diameter end and is sufficient to displace the rotor from its close clearance relation to liner 20.

Prior to this the bearing support structure for shaft means 28 has been assembled with prior knowledge of the appropriate degree of the difference in pressure to which the valve rotor is to be subjected in use. The eccentric ring or sleeve 64 placed in each tubular member 58 has its inner and outer peripheries formed on a uniform circle with the inner offset relative the outer, the effect of which is to provide a sleeve or ring with a graduated wall thickness. Depending on the anticipated direction of the resultant force on the valve rotor from the high temperature pressurized environment at the valve outlet, the ring 64 is inserted in the tubular member and rotatively positioned to place its thickest portion uppermost and, in the example of the drawings, rotatively positioned about 15° off from a vertical.

By use of dowel means 96 inserted in each housing element 58 and through a notch 98 in the inserted sleeve, the sleeves are fixed in the required position. Thus, the shaft bearings 66 within the sleeves 64 will be established off center with reference to the longitudinal central axis of the rotor housing defined by shell 10 and liner 20. In the example illustrated, this offset will be in the direction of the valve outlet. Accordingly, the rotor shaft means projected through the bearings 66 will in the inoperative condition of the rotor be offset from the center of the housing. The normal procedure which will be then followed, with the rotor backed from its operating position into the one chamber 36, is to energize the shaft means and valve rotor, with the rotor now exposed to the differential pressure environment established at its inlet and outlet. The means 84 and 85 are then activated to axially adjust the shaft means to bring the rotor within the liner 20. The high pressure to which the rotor 26 is then exposed at its bottom will immediately and inherently displace the rotor upwardly to essentially center the rotor in its housing. The arrangement provides therefore that the basic displacement of the rotor shaft means, and correspondingly the rotor, is such that in operation and exposure to the differential in applied pressure there is achieved an optimal running position of the valve rotor. The physical movement of the valve rotor is fractionally dissipated by a slight shaft deflection, a slight compression factor in the shaft bearings and finally through the eccentrics 64 and by way of tubular bearing housing members 58 through spider legs 60 and closure plate members 32.

It is significant to note that the pre-stressing of the closure plate units, which not only seal the ends of the valve housing but have supported thereby the housings for the rotor shaft bearings, establish that there is initially a conditioning thereof which will strengthen the parts to accommodate the dissipation of the deflection forces produced in operation of the valve. By virtue of the specific construction, by means of which there is a fractional and staged dissipation of the forces due to the differential environment to which the rotor is exposed, one insures a maximum operating life for the valve unit and its parts.

Further, where system adjustment indicates changes in resultant lines of force produced by change in differential pressure conditions, one need only rotatively adjust the eccentrics to compensate, thereby changing the position of the shaft bearings, the shaft means and its connected rotor. With the change and the system operating, once again the rotor will resultingly position in substantialy the center of its housing.

The simplicity of the invention improvement and its use should now be self evident. By the means and system provided one can have a valve which will, irrespective of differentially applied pressures and temperatures, be readily adapted to run smoothly without damage or unnecessary functional difficulties. Savings in power and maintenance cost and better product transfer is achieved thereby.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A material handling valve including a housing, a rotor, shaft means mounting said rotor within said housing, and means supporting said shaft means including means to displace said rotor from its required operating position, said displacing means being disposed at least to remote side portions of said shaft means and functioning on said rotor being subjected to the influence of differential pressure in use to provide that said rotor is substantially centered in its housing, said valve housing having means defining therein a generally conical chamber, said rotor having a complementary conical form, there being means defining closures to either end of said chamber and means projected in outwardly spaced relation to said end closure means accommodating the projection therein of said shaft means and nesting said means to at least opposite side portions of said shaft means, said means to at least opposite side portions of said shaft means being an eccentrically formed sleeve the position of which dictatates the non-operating position of said rotor, said means accommodating the projection therein of said shaft means being a housing for said sleeve and a bearing containing said shaft means in the housing and interiorly of said sleeve, the orientation of said sleeve dictating a compensating factor providing that said rotor is centered in its housing on application thereto of a predetermined differential pressure in use, said means projected in outwardly spaced relation to said end closure means being a bearing housing supported in projected relation to said closure means by divergent equidistantly spaced legs and there being means for applying to said legs a variable pressure to pre-stress said closure means and said legs to resist deformation on the occurrence of a differential pressure being applied to said rotor in use of said valve.

2. A rotary material handling valve including a valve body having at spaced locations a materials inlet and a materials outlet, a plug type rotor rotatable in said body, a shaft mounting said rotor and having at least one end projecting from an opening in at least one side portion of said body, a closure plate mounting to said body in a closing relation to said opening, one of said inlet or said outlet being in the use of the valve communicated with an environment of temperature and pressure substantially higher than that which is communicated to the other creating unbalance radial load conditions on said rotor, a bearing housing in projected connected relation to said plate and receiving the end of said shaft projected through said opening, the connection between said plate and said bearing housing being in the form of spaced legs, means for pre-stressing said legs and said plate to oppose an anticipated load on said rotor and said closure plate on operation of said valve, and means for achieving a mechanical offset of said shaft in said bearing housing to balance the radial load applied thereto by reason of the exposure of said rotor to differential temperatures and pressures applied thereto by way of said inlet and said outlet.

3. A rotary valve according to claim 2, wherein said means for achieving a mechanical offset of said shaft includes an eccentric sleeve installed in said bearing housing in surrounding relation to the said end of said shaft which projects therein.

4. A rotary valve according to claim 3, wherein said bearing housing has a circular bore with said eccentric sleeve received therein in a complementary fit, and a rolling bearing assembly in said bore including inner and outer races and in intermediately disposing series of rolling bearing elements, the inner race contacting the shaft and the outer race being supported within said eccentric sleeve.

5. A rotary valve according to claim 4, wherein said sleeve is rotatably adjustable in said bore, characterized by means for releasably fixing said sleeve in selected positions of rotary adjustment.

6. A rotary valve according to claim 2, wherein one of said legs in oriented substantially to oppose the line of an applied radial load resulting from the difference in the environments which the rotor is exposed with other legs divergent therefrom, the result being to properly stress the bearing housing in said line, the means to achieve a mechancial offset including a sleeve installed in said bearing housing and formed with a circular wall of graduating thickness, said sleeve being rotatably oriented to position the wall portion of greater thickness in said line and toward said one leg.

7. A material handling rotary valve, including a rotor housing providing at spaced locations a materials inlet and a materials outlet, one of said inlet or said outlet being in use of the valve communicated to an environment of pressure and temperature substantially higher than that which is communicated to the other, a rotor rotatable in said rotor housing and simultaneously exposed to the respective environments at said inlet and said oulet, shaft means mounting said rotor, bearing means in which said shaft means rotates and which is subjected in use to an unbalanced radial load due to the differential pressures and temperatures of said environments, means for effecting a preliminary offset of at least a portion of said bearing means in a direction substantially opposed to the direction of application of said unbalanced radial load, said rotor housing having at least one opening for the projection of said shaft means therethrough, a closure plate removably mounted to said rotor housing in closing relation to said opening and having an aperture for the passage of said shaft means therethrough, a bearing housing in longitudinally spaced relation to said aperture having said shaft means projecting therethrough, a rotary bearing in said bearing housing and forming therewith said bearing means, spider means mounting said bearing housing to said closure plate, means acting through the legs of said spider means to pre-stress structural components of said valve in opposition to the unbalanced radial load, said offsetting means being installed in said bearing housing between an interior surface thereof and said rotary bearing.

8. A material handling rotary valve, including a rotor housing providing at spaced locations a materials inlet and a materials outlet, one of said inlet or said outlet being in the use of the valve communicated to an environment of pressure and temperature substantially higher than that which is communicated to the other, a rotor rotatable in said rotor housing and simultaneously exposed to the pressures at said inlet and said outlet, shaft means mounting said rotor, bearing means in which said shaft means rotates and which is subjected to use to an unbalanced radial load due to the differential pressures and temperatures of said environments, means for effecting a preliminary offset of at least a portion of said bearing means in a direction substantially opposed to the direction of application of said unbalanced radial load, said rotor housing having at least one opening for the projection of said shaft means therethrough, a closure plate removably mounted to said rotor housing in closing relation to said opening and apertured for the passage of said shaft means therethrough, a bearing housing in longitudinally spaced relation to the apertured portion of said closure plate and accommodating a projecting portion of said shaft means, said bearing housing forming a part of said bearing means and being supported by said closure plate through divergent equidistantly spaced legs and there being means for applying to said legs a variable pressure to pre-stress said bearing housing and said legs.

* * * * *

UNITED STATES PATENT OFFICE
CERTIFICATE OF CORRECTION

Patent No. 3,750,902     Dated August 7, 1973

Inventor(s) James R. Starrett

It is certified that error appears in the above-identified patent and that said Letters Patent are hereby corrected as shown below:

Column 2, line 6, "pere-set" should read -- pre-set --. Column 3, line 45, "numberal" should read -- numeral --; line 26, before "by" insert -- to one end by the hub flange 38 and to their opposite end --. Column 4, line 51, "eccentiric" should read -- eccentric --. Column 6, line 19, "peiphery" should read -- periphery --; line 21, "periphery" should read -- in --. Column 7, line 46, "substantialy" should read -- substantially --. Column 9, line 21, "mechancial" should read -- mechanical --.

Signed and sealed this 25th day of June 1974.

(SEAL)
Attest:

EDWARD M. FLETCHER, JR.
Attesting Officer

C. MARSHALL DANN
Commissioner of Patents